J. A. Letts.
Wagon Brake.
Patented Jan. 29, 1861.
No. 31,249.
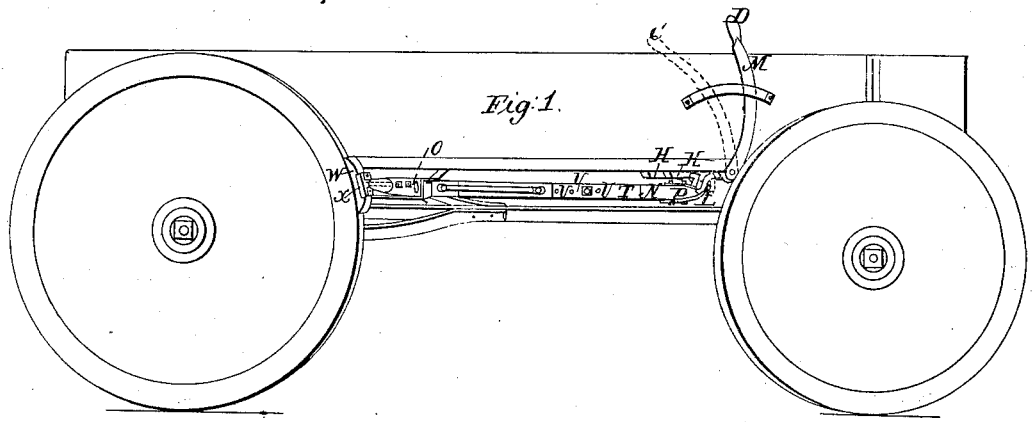
Fig. 1.
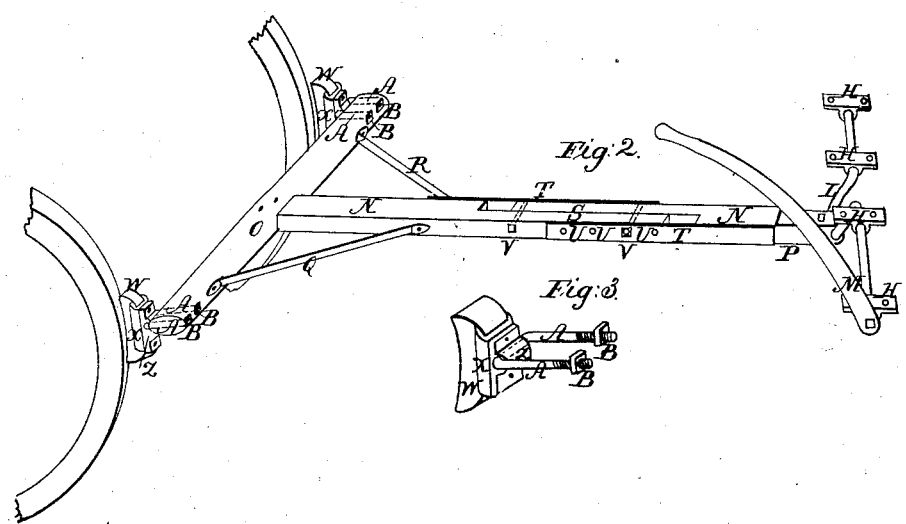
Fig. 2.
Fig. 3.
Witnesses
James O. Smith
Elias Conover
Inventor:
John A. Letts

UNITED STATES PATENT OFFICE.

JOHN A. LETTS, OF TRUMANSBURG, NEW YORK.

ADJUSTABLE CARRIAGE-BRAKE.

Specification of Letters Patent No. 31,249, dated January 29, 1861.

*To all whom it may concern:*

Be it known that I, JOHN A. LETTS, of Trumansburg, in the county of Tompkins and State of New York, have invented a new and useful Improvement in Carriage and Wagon Brakes; and I do hereby declare that the following is a full, clear, and exact description of the construction and operation of the same, reference being had to the annexed drawings, making a part of this specification, in which—

Figure 1 is a side view illustrating the operation of the brake upon farm wagons; Fig. 2 is a perspective view of the brake constructed according to my invention; Fig. 3 is a perspective of the brake block showing the mode of its attachment to the brake.

Similar letters refer to like parts in the several figures.

H, H, H, H, (Fig. 2) are the boxes supporting the bearings of the crank L, to the shaft of which is attached the lever M, for the purpose of conveying motion through the crank L to the brake O, the connection N from which, is attached to the crank by means of the strap P, said connection being mortised into the brake bar O, and firmly attached thereto by the braces Q, R, and so constructed as to increase or decrease its length when required, as is frequently the case with wagons drawing lumber of different lengths. This is effected by making the lap joint S, in the connection and on their sides are bolted the plates T, T, said plates being provided with three or more holes U, to allow of shifting the bolts V as the case may require.

W, (Fig. 3) is the brake block which is dovetailed into the hinge plate X, said plate being provided on the back with an eye Z, through which the staple A passes and also through the brake bar O, being held thereto by the nuts B, at the same time allowing the brake block to turn slightly for the purpose of accommodating itself to the different positions of the body of spring wagons or carriages, always being able to bring the whole of the rubbing surface of the block in contact with the wheel.

The operation of this brake is illustrated in Fig. 1, by moving the lever M from C to D, causing the crank L and brake O to move in an opposite direction to that of the lever, and as the crank approaches its horizontal center, a great pressure is effected against the wheels with but slight power applied to the lever.

In the application of this brake to wagons or carriages I do not confine myself to its attachment to the body, as in many cases it would be necessary to attach it to the gearing or under part of the wagon or carriage.

I do not claim the application of hand or foot levers to operate the brakes of carriages or wagons; but—

What I claim as my invention and desire to secure by Letters Patent is—

The combination of the lever M, the crank shaft L, connecting bars N, made adjustable by means of the plate T, and bolt V, the same acting on the brake bar O, and the rubber W, as described.

JOHN A. LETTS.

Witnesses:
BENJAMIN LANING,
WILLIAM REVARD.